United States Patent [19]

Gyben

[11] Patent Number: 4,944,327

[45] Date of Patent: Jul. 31, 1990

[54] RISER CHECK VALVE

[76] Inventor: Christopher J. Gyben, 9751 Canyon Country La., Escondido, Calif. 92026

[21] Appl. No.: 417,190

[22] Filed: Oct. 4, 1989

[51] Int. Cl.$^5$ .................................................. F16K 17/24
[52] U.S. Cl. .................................... 137/519.5; 239/572
[58] Field of Search ........................ 137/498, 519.5; 239/572

[56] References Cited

U.S. PATENT DOCUMENTS

| | | | |
|---|---|---|---|
| 954,178 | 4/1910 | Fowler | 137/519.5 X |
| 3,154,530 | 10/1964 | Majanovic | 137/519.5 X |
| 4,825,897 | 5/1989 | Shade | 137/519.5 X |

*Primary Examiner*—Robert G. Nilson
*Attorney, Agent, or Firm*—Thomas J. Tighe

[57] ABSTRACT

A T-shaped housing has a first channel defined by the housing which when coupled to a fluid distribution conduit forms a segment of the conduit. The housing has a second channel defined by the housing normal to the first channel and in fluid communication therewith. The interface between the first and second channels forms a mouth through which fluid passes from the first channel into the second channel. A sphere is disposed in a chamber beneath the second channel and is confined by fins to movement across the first channel generally toward and away from the mouth of the second channel. The sphere closes the mouth when seated against it. An outlet of the second channel is coupled to a riser. The rate of fluid flow from the first channel through the riser is restricted, for example, by a sprinkler head. In normal operation when the rate of fluid flow through the riser is so restricted, the interaction of the fluid pressure above and below the sphere together with gravity cooperate to prevent the sphere from closing the mouth of the riser channel. When the restriction is removed from the riser channel beyond a select threshold, for example by damage to the riser, the free flow of fluid out of the riser creates a fluid pressure differential sufficient to overcome the action of gravity on the mass of the sphere and the sphere is urged against the mouth of the riser channel thereby closing it.

12 Claims, 1 Drawing Sheet

RISER CHECK VALVE

BACKGROUND OF THE INVENTION

This invention relates to fluid check valves in general, and in particular to valves used to check the free flow of fluid from a broken or damaged riser.

Surface irrigation systems often incorporate sprinkler heads mounted on "risers" some distance above the surface being irrigated to increase the size of the area irrigated. Risers are pipes or conduits, typically copper or PVC plastic, which extend from ground-level, or below ground-level, fluid distribution conduits for the purpose of communicating fluid from the distribution conduits to the respective sprinkler heads which terminate them.

While the use of riser mounted sprinkler heads has great advantage in extending the area covered, it has a very significant disadvantage in that risers are exposed. Typically risers are not supported or buttressed in any way other then by their own strength. A copper or PVC riser can be very easily broken resulting most often in an open outlet, the fluid in the riser being no longer restricted by the sprinkler head. This wastes water and causes erosion.

This problem is especially acute for farmers who irrigate many and/or large fields. One or more broken risers can go unnoticed for long periods of time resulting in a terrible waste of water, serious erosion, and crop damage.

This invention presents a device which will allow fluid to flow normally into a riser when the egress of fluid from the riser is suitably restricted, as by a sprinkler head, but will arrest the flow of fluid into the riser when the egress is not so restricted. Thus if a riser becomes damaged and allows the fluid to be released from it unrestricted, the check valve according to this invention will automatically close and prevent the undesirable consequences described above.

Other advantages and attributes of this invention will be discussed or will be readily discernible from a reading of the text hereinafter.

SUMMARY OF THE INVENTION

This invention presents a fluid check valve having a generally T-shaped housing with a first fluid channel defined by the housing between an inlet and a first outlet. A second fluid channel is also defined by the housing substantially normal to the first fluid channel and in fluid communication with the first channel. The junction of the first and second channels defines a mouth through which fluid from the first channel passes into the second channel. A sphere or ball having a size sufficient to close the mouth when seated against the mouth is confined in a volume space defined by the housing below the mouth of the second channel. The mass of the sphere is sufficient for gravity to prevent closure of the mouth when the fluid flow rate through the second channel is restricted generally below a select threshold rate, for example by a sprinkler head, but the mass of the sphere also low enough to allow the sphere to be moved against and close the mouth when the rate of fluid flow through the second channel is generally beyond the select threshold rate. A means for confining the sphere comprises a pair of grids, one on either side of the mouth. The grids present little resistance to fluid flow but adequately confine the sphere. Preferably each grid comprises a plurality of fins protruding inward from the inner walls of the first channel. Preferably the sphere-side surface of each grid forms a pocket centered in the first channel. The sloping or curved sides of the pocket of each grid tends to center the sphere in the channel when the fluid flow is sufficient to drive the sphere against the grid.

An object of this invention is to provide a means whereby the terrible waste which occurs when an unattended riser becomes damaged to the extent that it releases fluid from it generally unrestricted.

Another object of this invention is to provide a means of checking the flow of fluid into a rising conduit when the rate of flow of the fluid through the conduit exceeds a threshold.

Other objects will be readily discernible upon a reading of the text hereinafter.

DESCRIPTION OF THE PREFERRED EMBODIMENT

Figure 1:
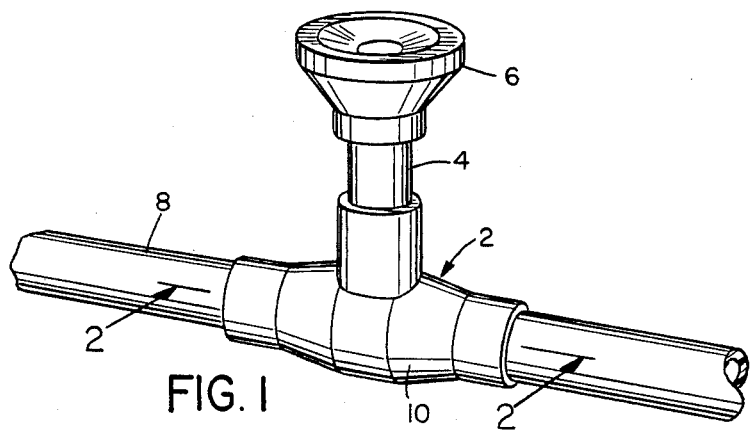
FIG. 1 is a perspective view of a typical riser unit incorporating the check valve coupling.

FIG. 1 illustrates the invention used to couple a riser 4, which is terminated by a sprinkler head 6, to a fluid distribution conduit 8. The housing 10 of the invention is shown to be generally T-shaped. It provides a fluid branch to distribute part of the fluid to the sprinkler head.

Referring to FIGS. 2, 3, 4 and 5, the device is illustrated as having a first or generally horizontal channel 12 defined by the housing 10. At opposite ends of the channel are two openings, 14a and 14b. In operation, either of the openings can serve as an inlet with the other serving as an outlet. A second generally vertical channel 16 is substantially normal to the first channel 12 and in fluid communication therewith. The open end of the second channel has means for attaching a riser 4 thereto, and one such means illustrated is inner threading 18. The junction of the first and second channels forms a mouth 26 through which fluid passes from the first channel to the second channel.

A ball or sphere 20 larger than the mouth 26 is disposed directly beneath the mouth and is confined by a plurality of fins 24 to movement in and around a space 22 centered directly beneath the mouth 26. There is a set of fins on either side of the mouth. The fins are actually planar fluid vanes, which look like dorsal fins, affixed to the inner walls of the first channel. They are uniformly spaced around the channel and are preferably made integral with the housing. They are oriented to present a minimal profile to fluid flowing in the first channel. Each set of fins uniformly protrude into the channel to a depth sufficient to form a blocking grid, a grid which prevents further movement of the sphere in the first channel in the direction of the grid. Thus the space 22 is defined by the walls of the first channel and the fin grids on either side of the mouth 26.

Figure 2:
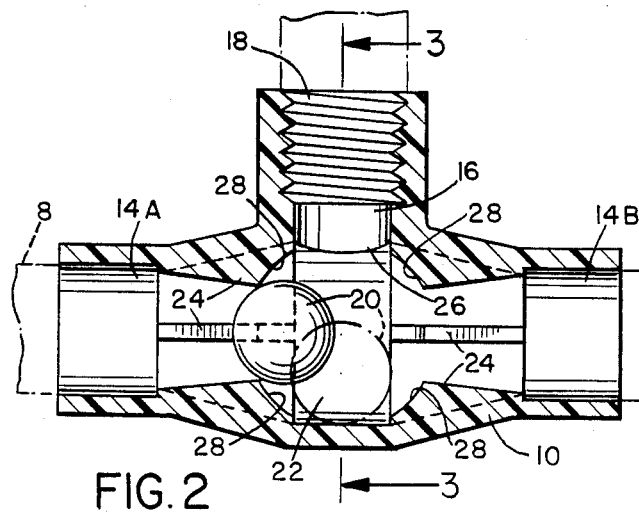
FIG. 2 is an enlarged sectional view taken on line 2—2 of FIG. 1, with the valve in normal flow position.
Figure 3:
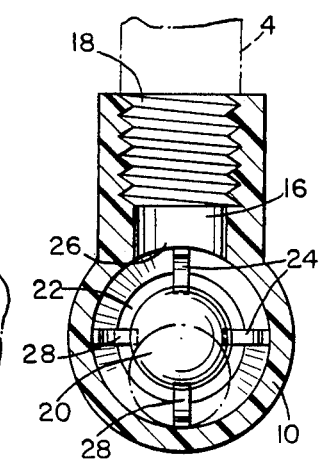
FIG. 3 is a sectional view taken on line 3—3 of FIG. 2.

For each set of fins, i.e., each fin grid, the fin edges 28 facing the sphere are uniformly concavely curved to guide the sphere to the center of said grid when the fluid flow is in the direction of said grid, the curved edges forming a recess, i.e. pocket, centered in the grid and also centered in the first channel; and if the flow is strong enough the sphere will be driven against the fin grid and the sloping sides of the pocket will center of the sphere in the recess thereby centering it in the first channel as shown by the solidly drawn spheres in FIGS. 2 and 3. This has the advantageous effects of minimizing fluid turbulence and minimizing, if not eliminating entirely, sphere oscillations which cause wear and tear on the sphere. If the flow is not so strong, then the sphere will tend to rest on the floor of the first channel as illustrated by the spheres drawn in phantom in FIGS. 2 and 3.

The diameter of the first channel is taperingly increased in the vicinity of the mouth 26 because of the presence of the sphere and the vanes. Preferably the widening of the channel is centered at, and symmetrical with respect to, the mouth. The tapered increase keeps the cross-sectional area of the first channel in the vicinity of the mouth as seen by the fluid at least equal to the cross-sectional area of the distribution conduit. This is to minimize flow resistance due to the sphere and fins. Preferably when the sphere is seated in either of the two grid recesses, the space around the sphere between the sphere and the channel wall has a minimum total cross-sectional area at least equal to the cross-sectional area of the distribution conduit.

Figure 4:
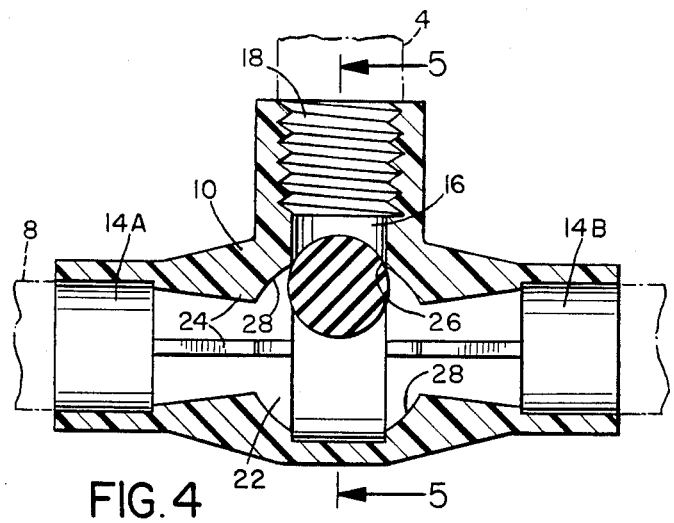
FIG. 4 is a view similar to FIG. 2, with the valve in shut-off position to a blocked riser.
Figure 5:
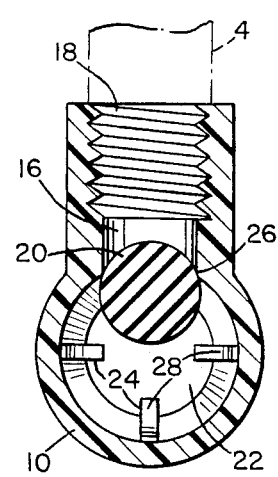
FIG. 5 is a sectional view taken on line 5—5 of FIG. 4.

The mouth 26 is adapted to be closed when the sphere is pressed against it. An outlet of the second channel is coupled to the riser 4. The rate of fluid flow from the first channel through the riser is restricted by the sprinkler head 6. In normal operation when the rate of fluid flow through the riser is so restricted, any fluid pressure differential between points above and below the sphere which opposes gravity and tends to buoy the sphere is insufficient to lift the sphere to the mouth 26 of the riser channel and the sphere is kept away from the mouth of the riser channel by the force of gravity. When the restriction is removed from the riser channel to the extent that the flow rate of the fluid through the second channel is beyond a selected threshold, for example by damage to the riser which allows greater efflux of the fluid from the riser channel, the increased flow rate decreases the fluid pressure above the sphere and creates a fluid pressure differential between above and below the sphere strong enough to overcome the force of gravity and lift the sphere upward against the mouth 26 of the riser channel 16 thereby closing it. Preferably there are a pair of fins (as illustrated in FIGS. 2, 3 and 4 of the drawings) protruding from a roof of the first channel (a side of the channel containing the mouth 26) and disposed on either side of the mouth such that their respective curved edges 28 act together with the curved sides of the first channel to guide the sphere to a centered position against the mouth 26.

It can be seen that the mass of the sphere is a primary consideration in setting the second channel flow rate threshold. The mass of the sphere must be large enough for gravity to prevent closure of the mouth when the fluid flow rate through the second channel is restricted generally below a selected threshold rate, for example by a sprinkler head. The mass of the sphere must also be small enough to allow the sphere to be lifted against and close the mouth when the rate of fluid flow through the second channel is generally beyond the selected threshold rate.

Although the description of the preferred embodiment specifically addressed a riser associated with a sprinkler head, it should be understood that this invention can be used to advantage in any situation where it is desirable to check the flow of fluid in a rising conduit branch when the flow rate exceeds a select threshold determined by the size and mass of the sphere. Moreover, it should be understood that this invention need not be embodied solely in a coupling housing, but rather it could be an integral part of a fluid distribution network. For example, the riser and the vertical channel of this invention could be one integrated channel, and the first or horizontal channel could be an integral part of a distribution conduit in which case the riser and the distribution conduit would both be parts of the housing.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A fluid check valve comprising:
   (a) a housing defining a first, generally horizontal fluid channel and a second, generally vertical fluid channel joining the first channel and in fluid communication therewith, the junction of the first and second channels defining a mouth through which fluid passes from the first channel into the second channel,
   (b) a sphere disposed in the first channel below the mouth for closing said mouth, the size of the sphere and the shape of the mouth being such that the sphere substantially closes the mouth when the sphere is pressed against the mouth,
   (c) means for confining movement of the sphere in the first channel to a volume space directly below the mouth,
   (d) the mass of the sphere being large enough for the force of gravity acting upon the sphere to prevent the sphere from closing the mouth when fluid is flowing through both channels and the rate of fluid flow from the first channel into the second channel is restricted generally below a threshold rate, but the mass of the sphere being small enough to allow the sphere to close said mouth when the rate of said fluid flow is generally beyond the threshold rate.

2. A fluid check valve comprising:
   (a) a housing defining a first, generally horizontal fluid channel and a second, generally vertical fluid channel joining the first channel and in fluid communication therewith, the junction of the first and second channels defining a mouth through which fluid passes from the first channel into the second channel,
   (b) a sphere disposed in the first channel below the mouth for closing said mouth, the size of the sphere and the shape of the mouth being such that the sphere substantially closes the mouth whenever the sphere is pressed against the mouth by an amount of fluid pressure in the first channel,
   (c) means for confining movement of the sphere in the first channel to a volume space directly below the mouth, force of gravity acting upon the sphere to prevent the sphere from closing the mouth when the fluid pressure felt by the sphere from above it is not exceeded by the fluid pressure felt by the sphere from below it by said amount, but the mass of the sphere being small enough to allow the sphere to be pressed against said mouth when the fluid pressure felt by the sphere from above it is exceeded by the fluid pressure felt by the sphere from below it by said amount.

3. The device according to claim 11 wherein the means for confining the sphere comprises a pair of grid means projecting into the first channel on opposite sides of the mouth, the sphere being disposed between the grid means and each grid means blocking the sphere from further travel along the first channel.

4. The device according to claim 2 wherein the means for confining the sphere comprises a pair of grid means projecting into the first channel on opposite sides of the mouth, the sphere being disposed between the grid means and each grid means blocking the sphere from further travel along the first channel.

5. The device according to claim 3 wherein the sphere-side surface of at least one of the grid means forms a pocket which tends to center the sphere in the first channel whenever the strength of fluid flow in said channel is strong enough to drive the sphere against said grid.

6. The device according to claim 4 wherein the sphere-side surface of at least one of the grid means forms a pocket which tends to center the sphere in the first channel whenever the strength of fluid flow in said channel is strong enough to drive the sphere against said grid.

7. The device according to claim 1 wherein the means for confining the sphere comprises a plurality of fins protruding inward from the inner walls of the first channel.

8. The device according to claim 2 wherein the means for confining the sphere comprises a plurality of fins protruding inward from the inner walls of the first channel.

9. The device according to claim 3 wherein at least one of the grid means for confining the sphere comprises a plurality of fins protruding inward from the inner walls of the first channel.

10. The device according to claim 4 wherein at least one of the grid means for confining the sphere comprises a plurality of fins protruding inward from the inner walls of the first channel.

11. The device according to claim 5 wherein at least one of the grid means for confining the sphere comprises a plurality of fins protruding inward from the inner walls of the first channel.

12. The device according to claim 6 wherein at least one of the grid means for confining the sphere comprises a plurality of fins protruding inward from the inner walls of the first channel.

* * * * *

UNITED STATES PATENT AND TRADEMARK OFFICE
CERTIFICATE OF CORRECTION

PATENT NO. : 4,944,327

DATED : July 31, 1990

INVENTOR(S) : Christopher J. Gyben

It is certified that error appears in the above-identified patent and that said Letters Patent is hereby corrected as shown below:

Column 4, claim 2, line 67, after "mouth" insert new paragraph --(d) the mass of the sphere being large enough for the--

Signed and Sealed this

Seventeenth Day of December, 1991

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,944,327

DATED : July 31, 1990

INVENTOR(S) : Christopher J. Gyben

It is certified that error appears in the above-identified patent and that said Letters Patent is hereby corrected as shown below:

In Claim 3, line 1, change "Claim 11" to --Claim 1--.

Signed and Sealed this

Twentieth Day of May, 1997

Attest:

BRUCE LEHMAN

Attesting Officer

Commissioner of Patents and Trademarks